US011262887B2

(12) United States Patent
Petersen

(10) Patent No.: US 11,262,887 B2
(45) Date of Patent: Mar. 1, 2022

(54) METHODS AND SYSTEMS FOR ASSIGNING FORCE VECTORS TO ROBOTIC TASKS

(71) Applicant: Toyota Research Institute, Inc., Los Altos, CA (US)

(72) Inventor: Josh Petersen, Mountain View, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 0 days.

(21) Appl. No.: 16/692,272

(22) Filed: Nov. 22, 2019

(65) Prior Publication Data

US 2021/0081081 A1  Mar. 18, 2021

Related U.S. Application Data

(60) Provisional application No. 62/900,143, filed on Sep. 13, 2019.

(51) Int. Cl.
| | |
|---|---|
| *G06F 3/0482* | (2013.01) |
| *B25J 13/00* | (2006.01) |
| *B25J 13/06* | (2006.01) |
| *G06F 3/01* | (2006.01) |
| *G06F 3/04847* | (2022.01) |

(Continued)

(52) U.S. Cl.
CPC .......... *G06F 3/0482* (2013.01); *B25J 13/006* (2013.01); *B25J 13/06* (2013.01); *G06F 3/011* (2013.01); *G06F 3/04847* (2013.01); *G06T 11/00* (2013.01); *B25J 5/007* (2013.01);
(Continued)

(58) Field of Classification Search
CPC .................................................... G06F 3/0482
See application file for complete search history.

(56) References Cited

U.S. PATENT DOCUMENTS

| | | | | |
|---|---|---|---|---|
| 5,835,693 A | * | 11/1998 | Lynch | ..................... G06F 30/17 |
| | | | | 345/473 |
| 8,965,576 B2 | | 2/2015 | Chen et al. | |

(Continued)

FOREIGN PATENT DOCUMENTS

| | | |
|---|---|---|
| WO | 2014110682 A1 | 7/2014 |
| WO | 2015168357 A1 | 11/2015 |

OTHER PUBLICATIONS

Kawasaki, Haruhisa, "Robot control and programming", Control Systems, Robotics, and Automation—vol. XXII, Encyclopedia of Life Support Systems (EOLSS), Published/Accessed: Jul. 23, 2019.

(Continued)

*Primary Examiner* — Daniel Rodriguez
(74) *Attorney, Agent, or Firm* — Dinsmore & Shohl LLP

(57) ABSTRACT

A system is disclosed and includes an electronic controller configured to generate a virtual reality representation of an environment. The electronic controller is configured to generate a menu within the virtual reality representation of the environment comprising at least one task user interface element and determine when an option for configuring a force parameter is selected from the at least one task user interface element in the menu. The electronic controller is configured to prompt a user to configure the force parameter for a virtual robot manipulation task and assign at least one of a force magnitude or a force direction to the virtual robot manipulation task in response to an input received from the prompt to configure the force parameter.

19 Claims, 9 Drawing Sheets

(51) Int. Cl.
*G06T 11/00* (2006.01)
*B25J 5/00* (2006.01)
*H04L 67/131* (2022.01)

(52) U.S. Cl.
CPC ............... *G05B 2219/39001* (2013.01); *G06T 2200/24* (2013.01); *H04L 67/38* (2013.01)

(56) References Cited

U.S. PATENT DOCUMENTS

| | | | |
|---|---|---|---|
| 9,092,698 | B2 | 7/2015 | Buehler et al. |
| 9,465,384 | B1* | 10/2016 | Jain .................... G05B 19/0426 |
| 9,582,933 | B1* | 2/2017 | Mosterman .......... G06K 9/2081 |
| 9,643,314 | B2 | 5/2017 | Guerin et al. |
| 9,671,777 | B1 | 6/2017 | Aichele et al. |
| 9,687,982 | B1* | 6/2017 | Jules ........................ B25J 9/161 |
| 9,880,553 | B1* | 1/2018 | Hoffmann ................ G06T 11/60 |
| 10,730,180 | B2* | 8/2020 | Rossano ............. B25J 11/0055 |
| 2010/0174410 | A1* | 7/2010 | Greer .................... A61B 34/37 700/264 |
| 2012/0293518 | A1* | 11/2012 | Geisner ................... A63F 13/42 345/474 |
| 2013/0343640 | A1* | 12/2013 | Buehler ................. B25J 9/1697 382/155 |
| 2015/0190925 | A1* | 7/2015 | Hoffman .................. B25J 19/04 700/257 |
| 2015/0314440 | A1* | 11/2015 | Parker .................... B25J 9/1689 700/253 |
| 2015/0328772 | A1* | 11/2015 | Kato ...................... B25J 9/1661 700/257 |
| 2016/0257000 | A1* | 9/2016 | Guerin ................... B25J 9/1605 |
| 2016/0332297 | A1* | 11/2016 | Sugaya ................ G06F 3/04842 |
| 2018/0029232 | A1* | 2/2018 | Ouchi ..................... B25J 9/1674 |
| 2018/0350118 | A1* | 12/2018 | Bastaldo-Tsampalis ..................... G06T 19/006 |
| 2019/0022864 | A1* | 1/2019 | Shimodaira ............ B25J 13/085 |
| 2019/0133689 | A1* | 5/2019 | Johnson ................. A61B 34/10 |
| 2019/0202053 | A1* | 7/2019 | Tan ........................ B25J 9/1671 |
| 2019/2002053 | | 7/2019 | Tan et al. |
| 2019/0344444 | A1* | 11/2019 | Morra .................... B25J 9/1692 |
| 2020/0117212 | A1* | 4/2020 | Tian ...................... G05D 1/0038 |
| 2020/0130176 | A1* | 4/2020 | Hudson ................... B25J 9/163 |
| 2020/0225673 | A1* | 7/2020 | Ebrahimi Afrouzi ........................ G05D 1/0214 |

OTHER PUBLICATIONS

Kawasaki, Haruhisa et al., "Virtual robot teaching for humanoid both-hands robots using multi-fingered haptic interface", IntechOpen, p. 107-127, Published/Accessed: Nov. 26, 2014.

Kunii, Y. et al., "Tele-teaching by human demonstration in virtual environment for robotic network system", Proceedings of International Conference on Robotics and Automation, Published/Accessed: Aug. 6, 2002.

Leeper, Adam et al., "Strategies for human-in-the-loop robotic grasping", Human-Robot Interaction (HRI), 2012 7th ACM/IEEE International Conference on, IEEE, Mar. 5, 2012.

The International Search Report and the Written Opinion of the International Search Authority with notification transmittal dated Nov. 26, 2020 in related International Application No. PCT/US2020/047132 (26 pages).

* cited by examiner

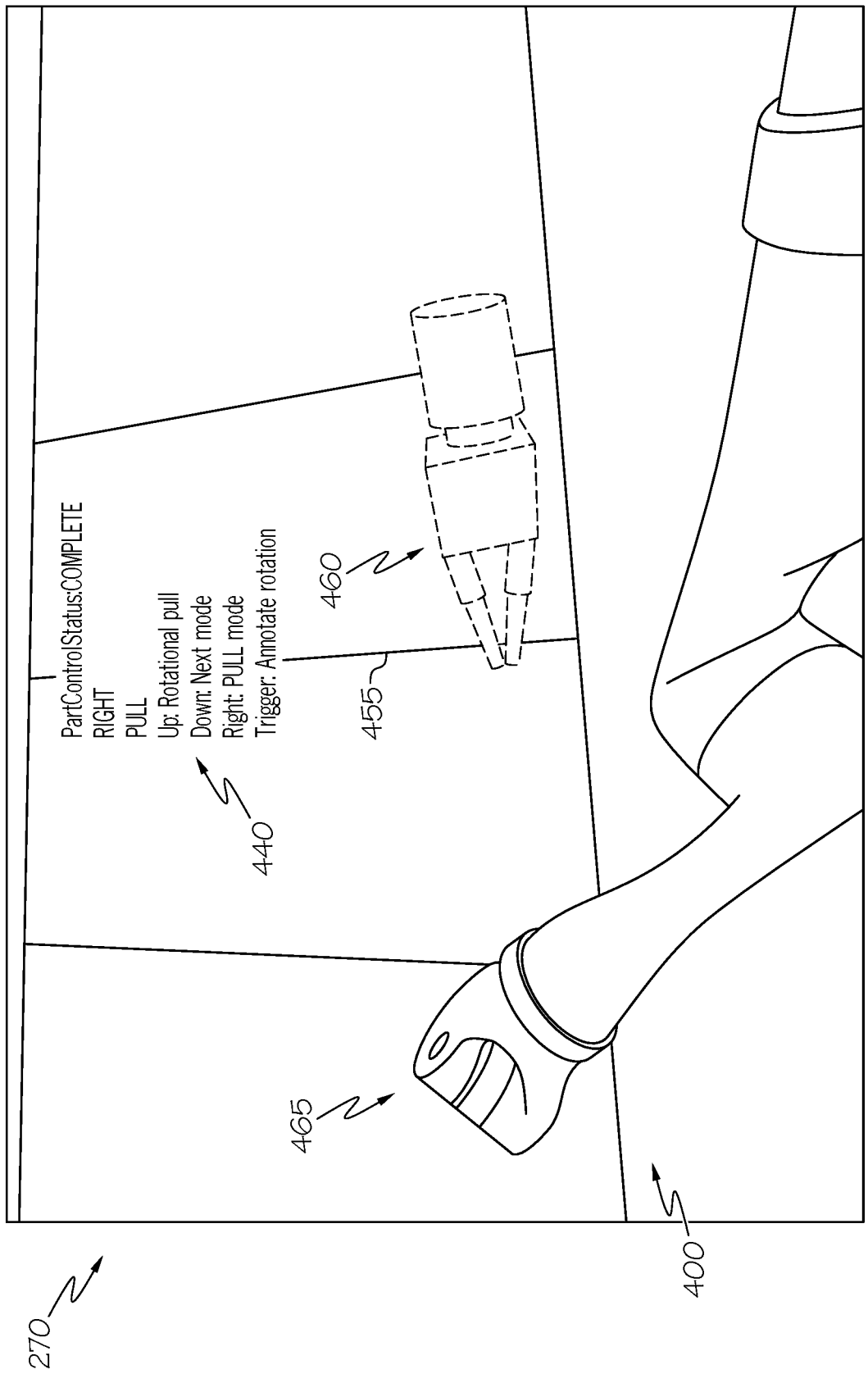

METHODS AND SYSTEMS FOR ASSIGNING FORCE VECTORS TO ROBOTIC TASKS

CROSS-REFERENCE TO RELATED APPLICATION

This application claims the benefit of U.S. Provisional Application No. 62/900,143 filed on Sep. 13, 2019, the entire contents of which are incorporated herein by reference.

TECHNICAL FIELD

The present disclosure generally relates to methods and systems for assigning force vectors to robotic tasks and, more particularly, assigning force vectors to robotic tasks within a virtual reality environment.

BACKGROUND

Robots may receive instructions from users and execute tasks based on the received instructions. As an example, a robot may move to a target location in response to receiving an instruction for moving to the target location from a user. As another example, a robot may carry an item from a first location to a second location in response to receiving an instruction for moving the item from a user. Furthermore, certain tasks may require the robot to exert a magnitude of force on an object while executing the corresponding tasks. As an example, while moving an object from a first location to a second location, a hand of the robot may exert a gripping force on the object, thereby enabling the robot to securely move the object from the first location to the second location.

Accordingly, a need exists for a system and method of teaching forces to manipulators for training a robot to perform tasks.

SUMMARY

In one aspect, a system includes an electronic controller configured to generate a virtual reality representation of an environment. The electronic controller is configured to generate a menu within the virtual reality representation of the environment comprising at least one task user interface element and determine when an option for configuring a force parameter is selected from the at least one task user interface element in the menu. The electronic controller is configured to prompt a user to configure the force parameter for a virtual robot manipulation task and assign at least one of a force magnitude or a force direction to the virtual robot manipulation task in response to an input received from the prompt to configure the force parameter.

In another aspect, a system includes an electronic controller configured to display a virtual reality representation of an environment. The electronic controller is configured to display a menu within the virtual reality representation comprising at least one task user interface element and determine when an option for configuring a force parameter is selected from the at least one task user interface element in the menu. The electronic controller is configured to display a prompt instructing a user to configure the force parameter for a virtual robot manipulation task and transmit a signal indicating an assignment of at least one of a force magnitude or a force direction to the virtual robot manipulation task in response to an input received from the prompt to configure the force parameter.

In yet another aspect, a method is disclosed and includes generating, by one or more processors, a virtual reality representation of an environment. The method includes generating, by the one or more processors, a menu within the virtual reality representation of the environment comprising at least one task user interface element. The method includes determining, by the one or more processors, when an option for configuring a force parameter is selected from the at least one task user interface element in the menu. The method includes prompting, by the one or more processors, a user to configure the force parameter for a virtual robot manipulation task. The method includes assigning, by the one or more processors, at least one of a force magnitude or a force direction to the virtual robot manipulation task in response to an input received from the prompt to configure the force parameter.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4E depicts an example virtual reality representation of an environment displayed by the virtual reality system according to one or more embodiments described and illustrated herein.

DETAILED DESCRIPTION

Figure 1A:
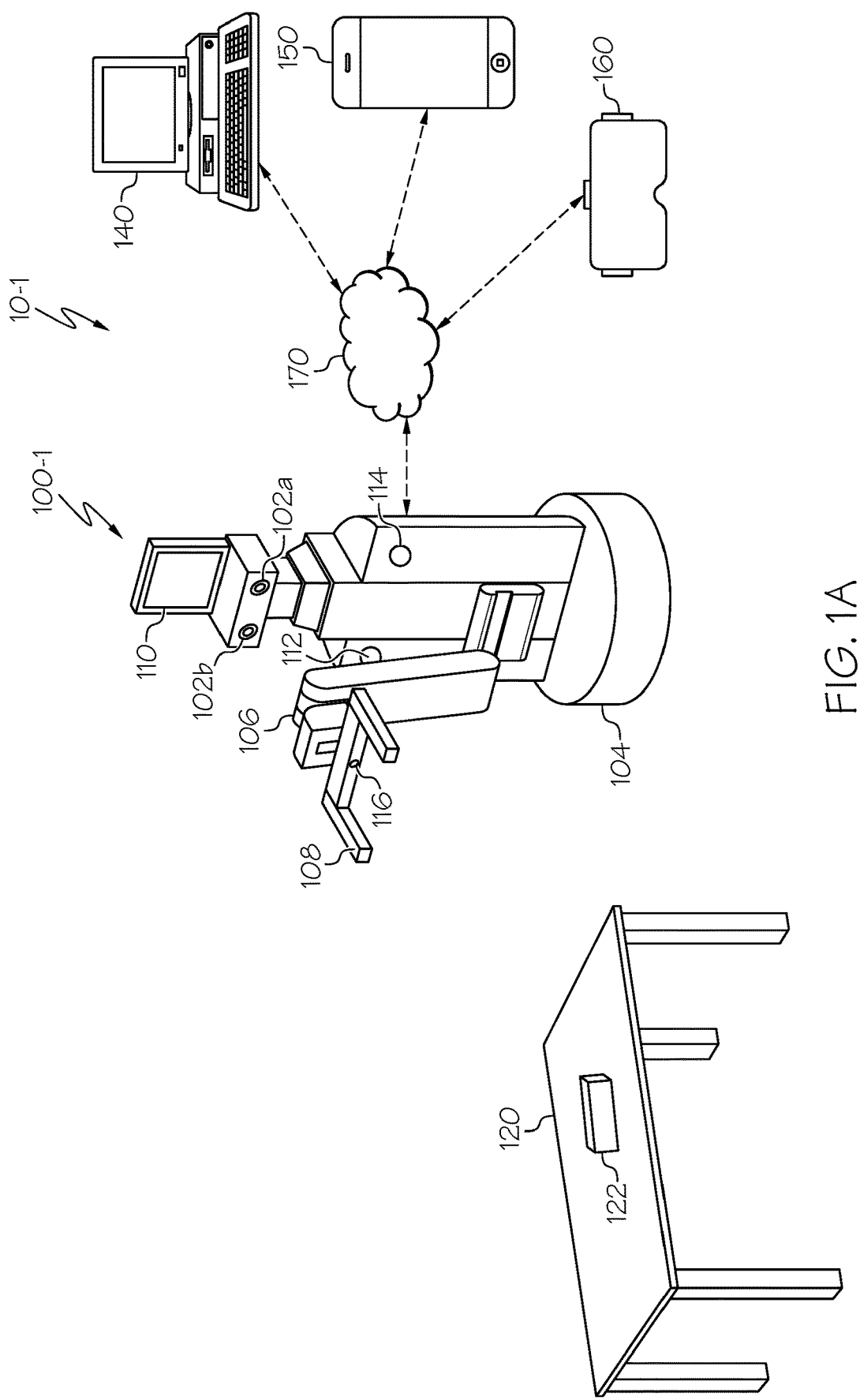
FIG. 1A schematically depicts an example robot system and environment according to one or more embodiments described and illustrated herein.

The embodiments described herein are directed to robots and virtual reality systems that assign force vectors to various tasks of a robot. As described below in further detail, the robot includes one or more imaging devices and one or more image capturing devices. A controller of a virtual reality system is communicatively coupled to the robot and includes machine-readable instructions. When the machine-readable instructions are executed by one or more processors of the controller, the virtual reality system is configured to display a virtual reality representation (e.g., a two-dimensional (2D) representation, a three-dimensional (3D) representation, etc.) of an environment based on the data obtained by the one or more imaging devices and/or the one or more image capturing devices. In some embodiments, the virtual reality representation of the environment may be generated by a computer model of the environment.

Furthermore, when the machine-readable instructions are executed by the one or more processors of the controller, the virtual reality system is configured to generate a menu including one or more task user interface elements. The task user interface elements are selectable using, for example, an input device of the virtual reality system. If a selected task is associated with a force vector, the virtual reality system may display a force vector user interface element, which enables a user of the virtual reality system to assign a force vector to a particular task of the robot. In some embodiments, the robot tasks and corresponding force vectors may be selected and assigned, respectively, by the user via a controller and stored using the robot system.

Assigning force vectors to certain tasks ensures desirable operation of the robot. As an example, assigning a force vector to a task ensures that a minimum force value for performing a certain task is provided, such as gripping and pulling a handle or knob of a door in order to open the door. As another example, assigning a force vector to a task ensures that a maximum force value for performing a certain task is not exceeded, thereby preventing the robot from damaging an object while, for example, gripping and pulling a handle or knob of a door in order to open the door. As yet another example, by assigning a force vector having a magnitude and direction to a wiping task (e.g., wiping a surface of a table using a sponge end effector that is grasped using, for example, a parallel-jaw gripper), a lateral movement of the robotic manipulator can ensure a constant or variable force is applied to the surface of the table to effect wiping of the surface. Accordingly, optimal operation of the robot may be achieved when force vectors are assigned to certain tasks.

As described herein, the term "task" refers to one or more movements of one or more robot components configured to be performed in combination to achieve a desired outcome. As a non-limiting example, a wiping task may include positioning a robotic manipulator at a distance from a surface of a table and laterally moving the robotic manipulator in a direction generally parallel to the surface of the table.

As described herein, the term "force vector" refers to a force (e.g., a velocity of motion or acceleration of a component) having a magnitude and a direction. The magnitude may be represented by any suitable numerical value and metric (e.g., Newtons) used to quantify the magnitude. In some embodiments, robot systems may be configured to measure an applied force magnitude using a force sensor. In other embodiments, robot systems may not be configured to directly measure an applied force magnitude. As such, the robot systems may determine an applied force by monitoring a speed and/or acceleration of a component from a first position to a second position and subsequently determine an applied force using a motor control system or other feedback system. The direction may indicate that the force is coplanar, noncoplanar, linear, nonlinear, rotational, or the like.

Now referring to FIG. 1A, an example robot system and environment 10-1 including a robot 100-1 is schematically depicted. As shown in the illustrated embodiment of FIG. 1A, the robot 100-1 may be a service robot configured to assist humans with various tasks in a residential facility, workplace, school, healthcare facility, manufacturing facility, and/or the like. As a non-limiting example, the robot 100-1 may assist a human with removing object 122 from table 120.

In various embodiments, the robot 100-1 includes image capturing devices 102a, 102b (collectively referred to as image capturing devices 102), a locomotion device 104, an arm 106, a gripping assembly 108, a screen 110, a microphone 112, a speaker 114, and one or more imaging devices 116. It should be understood that the robot 100-1 may include other components in other embodiments. It should also be understood that the embodiments described herein are not limited to any specific type of robot, and that the robot 100-1 may have any size, configuration, degrees of freedom, and/or other characteristics in other embodiments.

In some embodiments, the image capturing devices 102 may be any device that is configured to obtain image data. As a non-limiting example, the image capturing devices 102 may be digital cameras configured to obtain still images and/or digital video of objects located within the environment 10-1, such as the table 120 and the object 122. Accordingly, a controller (shown below in FIG. 2) may receive the image data and execute various functions based on the image data. Example functions include, but are not limited to, object recognition using image processing algorithms (e.g., a machine learning algorithms or other suitable algorithms) and navigation algorithms for navigating the robot 100-1 within the environment 10-1.

In some embodiments, at least one of the image capturing devices 102 may be a standard definition (e.g., 640 pixels× 480 pixels) camera. In various embodiments, at least one of the image capturing devices 102 may be a high definition camera (e.g., 1440 pixels×1024 pixels or 1266 pixels×1024 pixels). In some embodiments, at least one of the image capturing devices 102 may have a resolution other than 640 pixels×480 pixels, 1440 pixels×1024 pixels, or 1266 pixels× 1024 pixels.

In some embodiments, the locomotion device 104 may be utilized by the robot 100-1 to maneuver within the environment 10-1. As a non-limiting example, the locomotion device 104 may be a tracked locomotion device. As another non-limiting example and as described below in further detail with reference to FIG. 1B, the robot 100-1 may maneuver within the operating space using one or more wheels. In some embodiments, the robot 100-1 may be an unmanned aerial vehicle or an unmanned submersible.

In various embodiments, the arm 106 and gripping assembly 108 may be actuated using various mechanisms (e.g., servo motor drives, pneumatic drives, hydraulic drives, electro-active polymer motors, and/or the like) to manipulate items that the robot 100-1 encounters within the environment 10-1. The gripping assembly 108 may be rotatably coupled to the arm 106, and the arm 106 may have, for example, six degrees of freedom. The gripping assembly 108 may include the one or more imaging devices 116, and the view and/or orientation of the one or more imaging devices 116 is configured to rotate in response to a rotation of the gripping assembly 108.

While the illustrated embodiment illustrates one arm 106 and one gripping assembly 108, it should be understood that the robot 100-1 may include any number of arms and gripping assemblies in other embodiments. As a non-limiting example and as described below in further detail with reference to FIG. 1B, the robot 100-1 may include two arms.

In some embodiments, the screen 110 may display text, graphics, images obtained by the image capturing devices 102, and/or video obtained by the image capturing devices 102. As a non-limiting example, the screen 110 may display text that describes a task that the robot 100-1 is currently executing (e.g., picking up the object 122). In some embodiments, the screen 110 may be a touchscreen display or other suitable display device.

In various embodiments, the microphone 112 may record audio signals propagating in the environment 10-1 (e.g., a user's voice). As a non-limiting example, the microphone 112 may be configured to receive audio signals generated by a user (e.g., a user voice command) and transform the acoustic vibrations associated with the audio signals into a speech input signal that is provided to the controller (shown in FIG. 2) for further processing. In some embodiments, the speaker 114 transforms data signals into audible mechanical vibrations and outputs audible sound such that a user proximate to the robot 100-1 may interact with the robot 100-1.

The robot 100-1 may include one or more imaging devices 116 that are configured to obtain depth information of the environment 10-1. The one or more imaging devices 116 may include, but is not limited to, RGB-D sensors and/or other depth sensors configured to obtain depth information of the environment 10-1. The one or more imaging devices 116 may have any suitable resolution and may be configured to detect radiation in any desirable wavelength band, such as an ultraviolet wavelength band, a near-ultraviolet wavelength band, a visible light wavelength band, a near infrared wavelength band, an infrared wavelength band, and/or the like.

In some embodiments, the robot 100-1 may communicate with at least one of a computing device 140, a mobile device 150, and/or a virtual reality system 160 via network 170 and/or using a wireless communication protocol, as described below in further detail with reference to FIG. 2. As a non-limiting example, the robot 100-1 may capture an image using the image capturing devices 102 and obtain depth information using the one or more imaging devices 116. Subsequently, the robot 100-1 may transmit the image and depth information to the virtual reality system 160 using the wireless communication protocol. In response to receiving the image and depth information, the virtual reality system 160 may display a virtual reality representation of the environment 10-1 (also referred to herein as a virtual reality environment), as described below in further detail. As a non-limiting example, the virtual reality representation may indicate the view of the robot 100-1 obtained by the image capturing devices 102, a map of a room or building in which the robot 100-1 is located, the path of the robot 100-1, or a highlight of an object in which the robot 100-1 may interact with (e.g., the object 122).

As another non-limiting example, the computing device 140 and/or the mobile device 150 (e.g., a smartphone, laptop, PDA, and/or the like) may receive the images captured by the image capturing devices 102 and display the images on a respective display. In response to receiving the image and depth information, the computing device 140 and/or the mobile device 150 may also display the virtual reality representation of the environment 10-1.

Figure 1B:
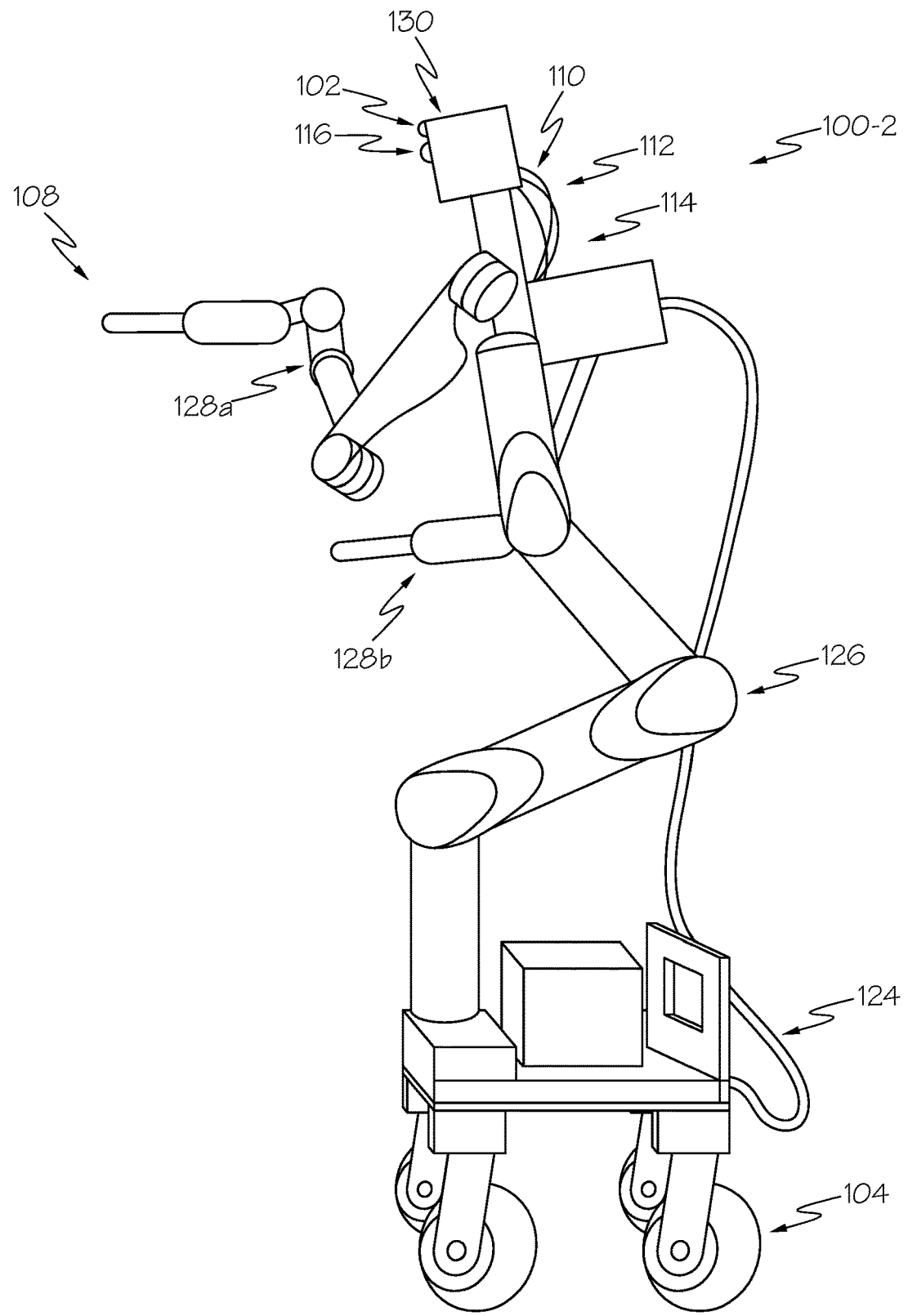
FIG. 1B schematically depicts an example robot according to one or more embodiments described and illustrated herein.

With reference to FIG. 1B, another example environment 10-2 including robot 100-2 is schematically depicted. Robot 100-2 is similar to the robot 100-1 described above with reference to FIG. 1A, but in this embodiment, the robot 100-2 includes a chassis portion 124, a torso portion 126, arms 128a, 128b (collectively referred to as arms 128), and head portion 130.

In some embodiments, the chassis portion 124 includes the locomotion device 104. As a non-limiting example, the locomotion device 104 includes four powered wheels that provide the chassis portion 124 eight degrees of freedom, thereby enabling the robot 100-2 to achieve selective maneuverability and positioning within the environment 10-2. Furthermore, the torso portion 126, which is mounted to the chassis portion 124, may include one or more robotic links that provide the torso portion 126, for example, five degrees of freedom, thereby enabling the robot 100-2 to position the torso portion 126 over a wide range of heights and orientations.

In some embodiments, the arms 128 may each have, for example, seven degrees of freedom, thereby enabling the robot 100-2 to position the arms 128 over a wide range of heights and orientations. Furthermore, each of the arms 128 may include a respective gripping assembly 108, and the arms 128 may be rotatably mounted to the torso portion 126. In some embodiments, the head portion 130 of the robot includes the image capturing devices 102, the screen 110, the one or more imaging devices 116, the microphone 112, and the speaker 114.

Figure 2:
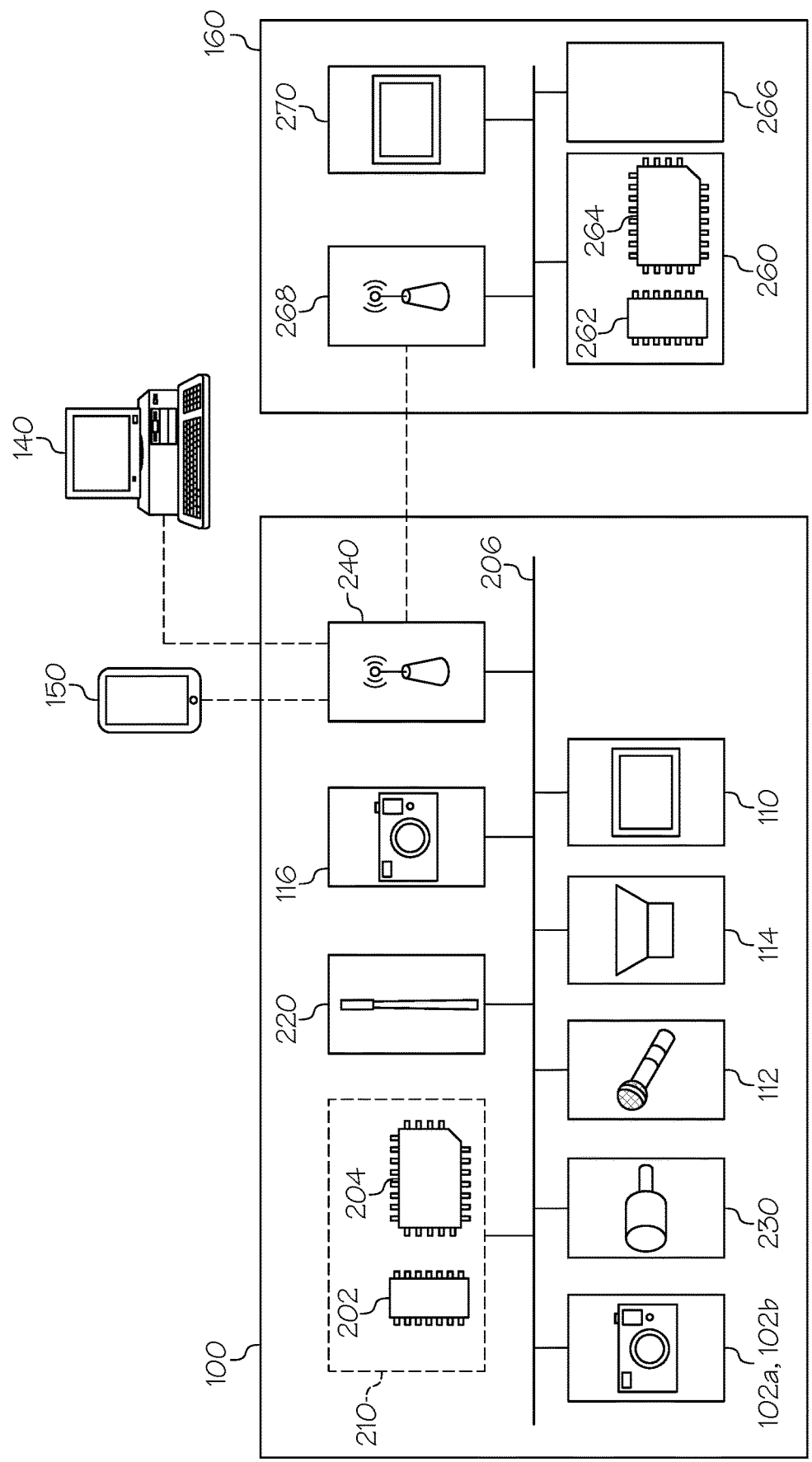
FIG. 2 schematically depicts an illustrative system diagram of an example robot and a virtual reality system according to one or more embodiments described and illustrated herein.

Referring now to FIG. 2, various internal components of robot 100 (i.e., one of robots 100-1, 100-2) are illustrated. The robot 100 includes a controller 210 that includes one or more processors 202 and one or more memory modules 204, the image capturing devices 102a, 102b, a satellite antenna 220, actuator drive hardware 230, network interface hardware 240, the screen 110, the microphone 112, the speaker 114, and the one or more imaging devices 116. In some embodiments, the one or more processors 202, and the one or more memory modules 204 may be provided in a single integrated circuit (e.g., a system on a chip). In some embodiments, the one or more processors 202, and the one or more memory modules 204 may be provided as separate integrated circuits.

Each of the one or more processors 202 is configured to communicate with electrically coupled components and may be any commercially available or customized processor suitable for the particular applications that the robot 100 is designed to operate. Furthermore, each of the one or more processors 202 may be any device capable of executing machine readable instructions. Accordingly, each of the one or more processors 202 may be a controller, an integrated circuit, a microchip, a computer, or any other computing device. The one or more processors 202 are coupled to a communication path 206 that provides signal interconnectivity between various modules of the robot 100. The communication path 206 may communicatively couple any number of processors with one another, and allow the modules coupled to the communication path 206 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 206 may be formed from any medium that is capable of transmitting a signal such as, for example, conductive wires, conductive traces, optical waveguides, or the like. Moreover, the communication path 206 may be formed from a combination of mediums capable of transmitting signals. In one embodiment, the communication path 206 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 204 may be coupled to the communication path 206. The one or more memory modules 204 may include a volatile and/or nonvolatile computer-readable storage medium, such as RAM, ROM, flash memories, hard drives, or any medium capable of storing machine readable instructions such that the machine readable instructions can be accessed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, user-oriented programming (OOP), scripting languages, microcode, etc., that may be compiled or assembled into machine readable instructions and stored on the one or more memory modules 204. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 204 may be configured to store one or more modules, each of which includes the set of instructions that, when executed by the one or more processors 202, cause the robot 100 to carry out the functionality of the module described herein. For example, the one or more memory modules 204 may be configured to store a robot operating module, including, but not limited to, the set of instructions that, when executed by the one or more processors 202, cause the robot 100 to carry out general robot operations.

Furthermore, the one or more memory modules 204 may store a virtual reality representation generation module, an object detection module, and a menu module. In some embodiments, the virtual reality representation generation module is configured to generate a virtual reality representation of the environment 10 based on image data obtained by the image capturing devices 102 and the depth data obtained by the one or more imaging devices 116. In response to generating the virtual reality representation, the virtual reality representation generation module is configured to transmit the virtual reality representation to at least one of the computing device 140, the mobile device 150, and/or the virtual reality system 160 for subsequent displaying by the respective device and/or system. In some embodiments, the object detection module is configured to identify and recognize objects located in the environment 10 based on the generated virtual reality representation. In various embodiments, the menu module is configured to generate one or more task user interface elements that are displayed within the virtual reality representation. As described below in further detail with reference to FIG. 3 and FIGS. 4A-4F, the menu module is also configured to generate a force vector interface element in response to a selection of a task user interface element indicating that the corresponding robotic task will interact with a load force. The force vector interface element is configured to enable the user to designate the force vector corresponding to the particular task, as described below in further detail with reference to FIG. 3.

The virtual reality representation generation module, the menu module, and the object detection module may be a program module in the form of operating systems, application program modules, and other program modules stored in one or more memory modules. The menu module and the object detection module may include, but are not limited to, routines, subroutines, programs, objects, components, data structures, and the like for performing specific tasks or executing specific data types described below with reference to FIG. 3.

The image capturing devices 102 may be coupled to the communication path 206. The image capturing devices 102 may receive control signals from the one or more processors 202 to acquire image data of a surrounding operating space, and to send the acquired image data to the one or more processors 202 and/or the one or more memory modules 204 for processing and/or storage. The image capturing devices 102 may be directly connected to the one or more memory modules 204. In an alternative embodiment, the image capturing devices 102 include dedicated memory devices (e.g., flash memory) that are accessible to the one or more processors 202 for retrieval.

Likewise, the screen 110, the microphone 112, the speaker 114, and the one or more imaging devices 118 may be coupled to the communication path 206 such that the communication path 206 communicatively couples the screen 110, the microphone 112, the speaker 114, and the one or more imaging devices 118 to other modules of the robot 100. The screen 110, the microphone 112, the speaker 114, and the one or more imaging devices 118 may be directly connected to the one or more memory modules 204. In an alternative embodiment, the screen 110, the microphone 112, the speaker 114, and the one or more imaging devices 118 may include dedicated memory devices that are accessible to the one or more processors 202 for retrieval.

The robot 100 includes a satellite antenna 220 coupled to the communication path 206 such that the communication path 206 communicatively couples the satellite antenna 220 to other modules of the robot 100. The satellite antenna 220 is configured to receive signals from global positioning system satellites. Specifically, in one embodiment, the satellite antenna 220 includes one or more conductive elements that interact with electromagnetic signals transmitted by global positioning system satellites. The received signal is transformed into a data signal indicative of the location (e.g., latitude and longitude) of the satellite antenna 220 or a user positioned near the satellite antenna 220, by the one or more processors 202. In some embodiments, the robot 100 may not include the satellite antenna 220.

The actuator drive hardware 230 may comprise the actuators and associated drive electronics to control the locomotion device 104, the arm 106, the gripping assembly 108, and any other external components that may be present in the robot 100. The actuator drive hardware 230 may be configured to receive control signals from the one or more processors 202 and to operate the robot 100 accordingly. The operating parameters and/or gains for the actuator drive hardware 230 may be stored in the one or more memory modules 204.

The robot 100 includes the network interface hardware 240 for communicatively coupling the robot 100 with the computing device 140, the mobile device 150, and/or the virtual reality system 160. The network interface hardware 240 may be coupled to the communication path 206 and may be configured as a wireless communications circuit such that the robot 100 may communicate with external systems and devices. The network interface hardware 240 may include a communication transceiver for sending and/or receiving data according to any wireless communication standard. For example, the network interface hardware 240 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 240 includes a Bluetooth transceiver that enables the robot 100 to exchange information with the computing device 140, the mobile device 150, and/or the virtual reality system 160 via Bluetooth communication. In some embodiments, the computing device 140, the mobile device 150, and/or the virtual reality system 160 may be authenticated prior to initiating communication with the robot 100 through the network interface hardware 240. In some embodiments, the robot 100 may not include the network interface hardware 240.

The virtual reality system 160 includes a controller 260 that includes one or more processors 262 and one or more memory modules 264, an input device 266 (e.g., a handheld motion-sensitive controller, a gesture recognition device, a device including buttons, dials, knobs, joysticks, etc.), network interface hardware 268, and a display device 270. The one or more processors 262, one or more memory modules 264, and the network interface hardware 268 may be components similar to the one or more processors 202, one or more memory modules 204, and the network interface hardware 240. While the above embodiments describe the one or more memory modules 204 storing the menu module and the object detection module, it should be understood that the one or more memory modules 264 may include the virtual reality representation module, the menu module, and/or the object detection module in other embodiments. It should also be understood that the computing device 140 and the mobile device 150 may include one or more processors, one or more memory modules, an input device, a network interface hardware, and a display in other embodiments.

In various embodiments, a user may select one of the one or more task user interface elements and define a force vector using the input device 266. The display device 270, which may be configured to be worn by the user, may include a strap or other similar element for securing the display device 270 to the user's body (e.g., the head of the user). Furthermore, the display device 270 may include a display that is configured to display the virtual reality representation generated by the robot 100.

Figure 3:
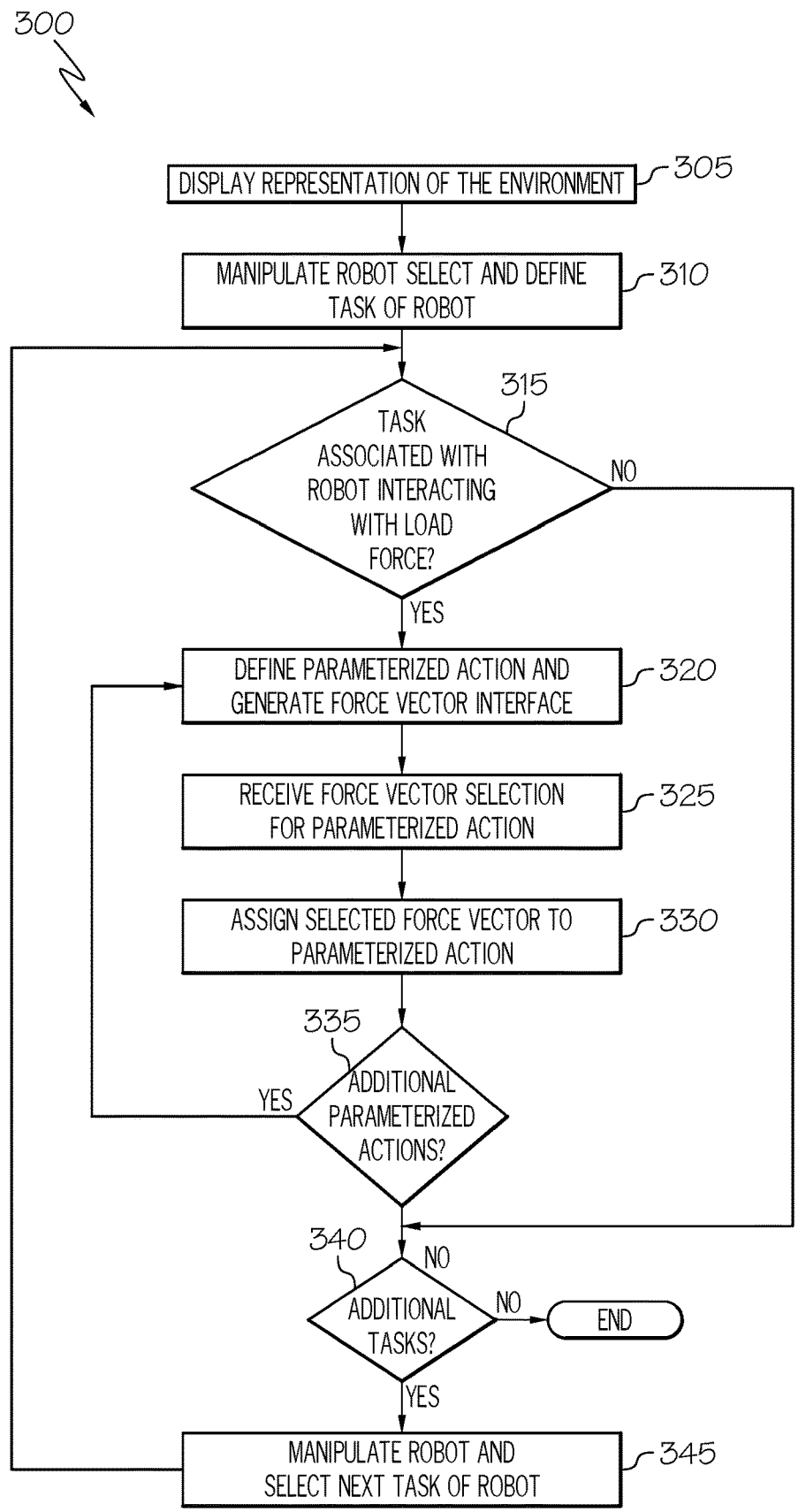
FIG. 3 schematically depicts a flowchart of a method of assigning force vectors to certain tasks of the robot according to one or more embodiments described and illustrated herein.

With reference to FIG. 3, a flowchart of a method 300 of assigning a force vector to a robotic task is shown. In some embodiments, the method 300 may be implemented as logic within the machine readable instructions that, when executed by the one or more processors 202, perform the steps described herein. While the method 300 depicts a specific sequence of steps, additional embodiments of the present disclosure are not limited to any particular sequence and may include additional or less steps. It should also be understood that the steps described herein may be executed by at least one of the computing device 140, the mobile device 150, and the virtual reality system 160 in other embodiments.

At step 305, the virtual reality system 160 displays a representation of the environment 10. In some embodiments, the robot 100 may initially obtain image data of the environment 10 using the one or more image capturing devices 102 and depth information of the environment 10 using the one or more imaging devices 116. Subsequently, the one or more processors 202 of the robot 100 may be configured to generate a virtual reality representation of the environment 10 based on the obtained image data and the depth information. Additionally, the object detection module may identify and recognize objects located within the environment 10 and generate indications corresponding to the identified and recognized objects. Further, the menu module may generate one or more task user interface elements.

Figure 4A:
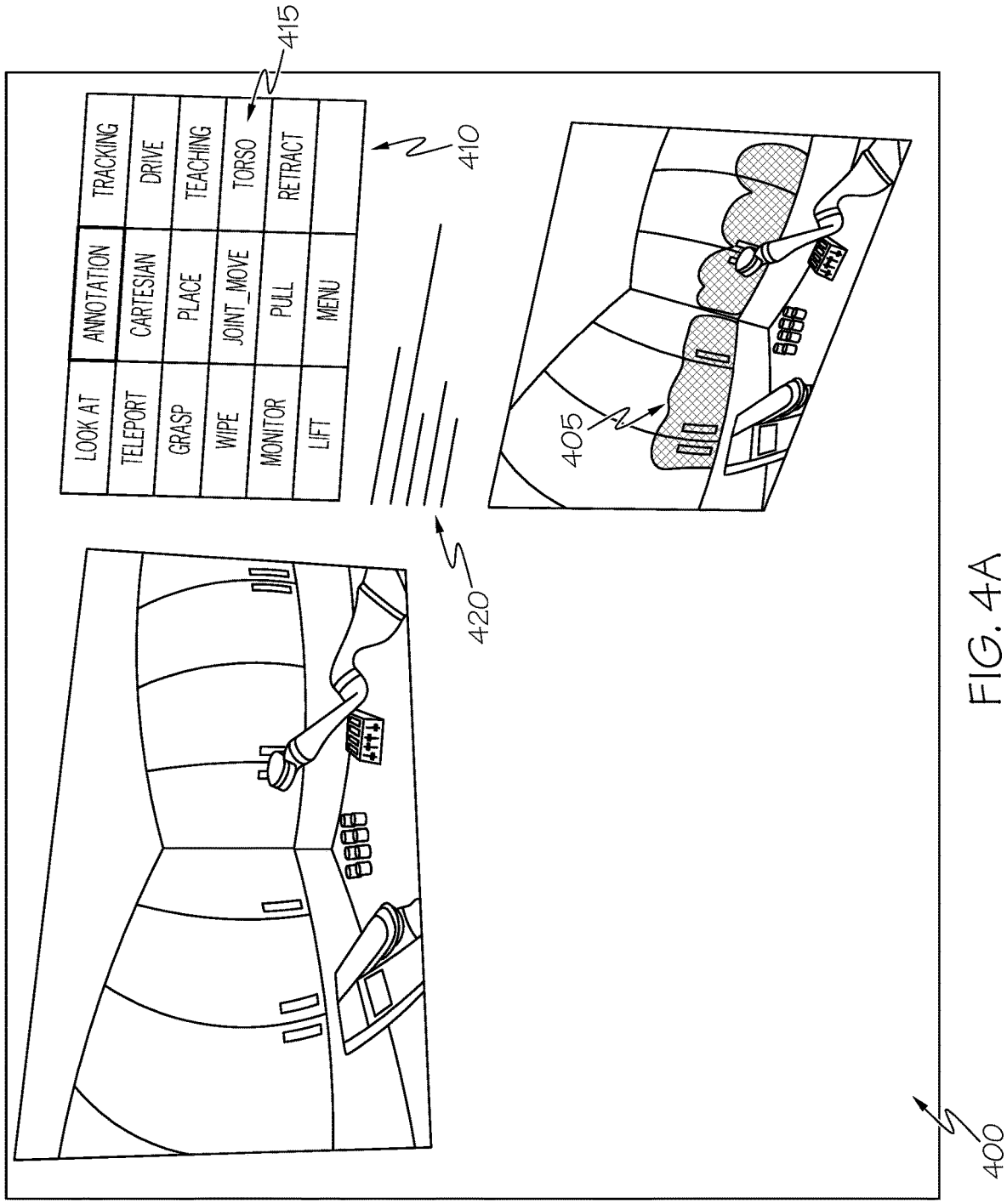
FIG. 4A depicts an example virtual reality representation of an environment displayed by the virtual reality system according to one or more embodiments described and illustrated herein.

Subsequently, the one or more processors 202 may transmit the virtual reality representation of the environment 10, indicators corresponding to the identified and recognized objects, and the one or more task user interface elements to the virtual reality system 160. Accordingly, the display device 270 of the virtual reality system 160 may then display the virtual reality representation, the indicators corresponding to the identified and recognized objects, and the one or more task user interface elements. As a non-limiting example and as shown in FIG. 4A, virtual reality representation 400 may include a plurality of regions 405 associated with the identified and recognized objects (e.g., a knob/handle of a cabinet door), a menu 410 including a one or more task user interface elements 415, and supplementary text 420 describing various operating features and/or characteristics of the robot 100.

Each of the one or more task user interface elements 415 may be associated with robotic tasks that can be sequenced with other robotic tasks. As non-limiting examples, the one or more task user interface elements 415 may be associated with robotic tasks including, but not limited to, grasping, lifting, placing, pulling, retracting, wiping, moving a joint, driving to a position, controlling a velocity of the robot 100, following, looking and stopping, and the like. Furthermore, each robotic task may have one or more movements associated therewith, such as joint moves or Cartesian moves of one or more portions of the robot 100. Each of the one or more movements may implement different control methods, such as position control, velocity control, admittance control, and/or motion control.

In some embodiments, each robotic task may have various parameterized actions. As used herein, a parametrized action may refer to an action that may be represented in terms of a parameter. As a non-limiting example, a grasping task may include, but is not limited to, a gripper angle parameter, a 6D approach parameter, a grasp parameter, and a lift pose parameter for the gripping assembly 108. In some embodiments, defining the parameterized actions may enable the robot 100 to execute a sequence of steps associated with the grasping task. As a non-limiting example, the sequence may include opening the gripping assembly 108 to a desired gripper angle; planning and executing a collision-free path for the gripping assembly 108 to a 6D approach pose; moving the gripping assembly 108 to the 6D grasp pose; stopping on contact; closing the gripping assembly 108; and moving the gripping assembly 108 to the 6D lift pose.

In some embodiments, each robotic task may have various non-parameterized robot manipulations and/or actions that may be defined by a user. As used herein, a non-parameterized action may refer to an action that is not represented in terms of a parameter. Non-limiting examples of non-parameterized robot manipulations and/or actions include, but are not limited to, moving the robot 100 in a defined direction. The non-parameterized robot manipulations and/or actions may be defined by the user via the input device 266 (e.g., a handheld motion controller) in the virtual reality environment.

Figure 4B:
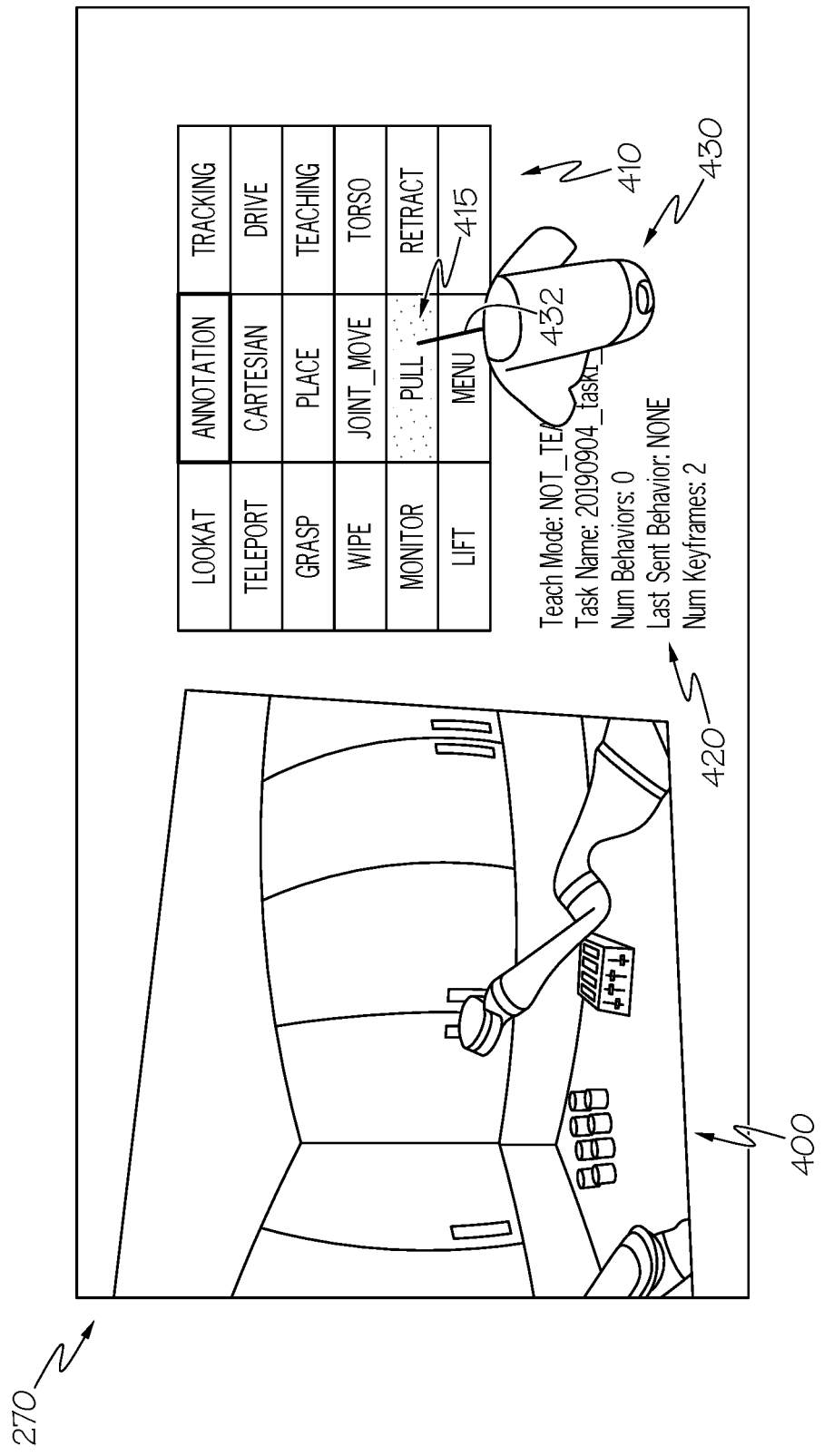
FIG. 4B depicts an example virtual reality representation of an environment displayed by the virtual reality system according to one or more embodiments described and illustrated herein.

Referring back to FIG. 3, at step 310, a user of the virtual reality system 160 manipulates the robot 100 and selects a task. In some embodiments, the user may use the input device 266 of the virtual reality system 160 to manipulate the robot 100 and/or select the task of the robot 100. As a non-limiting example and as shown in FIG. 4B, when the user is using the input device 266, the virtual reality representation 400 may include a graphical element 430 representing the input device 266. Moving and interacting with the input device 266 may cause the graphical element 430 to move and/or adjust its orientation within the virtual reality representation 400 based on the movement and/or interaction with the input device 266. As a non-limiting example, tilting the input device 266 toward the ground may cause the graphical element 430 to tilt toward the ground of the virtual reality representation 400. While the graphical element 430 is depicted as an input device, it should be understood that the graphical element 430 may have varying sizes and/or shapes in other embodiments.

Furthermore, the graphical element 430 may include an indicator 432 projecting therefrom indicating which task user interface element of the one or more task user interface elements 415 the input device 266 is currently aligned with. As a non-limiting example and as shown in FIG. 4B, the user is currently positioning the input device 266 such that the corresponding graphical element 430 is aligned with a task user interface element corresponding to the pulling task.

Referring back to FIG. 3, at step 315, the one or more processors 202 determine whether the selected task is associated with the robot 100 interacting with a load force. In some embodiments, a task may be associated with the robot 100 interacting with a load force if at least one of the corresponding parameterized actions is associated with interacting with a load force. Non-limiting examples of tasks that may be associated with interacting with a load force include grasping, lifting, placing, pulling, retracting, wiping, and the like. Non-limiting examples of tasks that may not be associated with interacting with a load force include driving, following with active obstacle avoidance, looking and stopping, etc. It should be understood that any one of the various tasks may be designated as one that interacts with a load force, and the one or more processors 202 may reference a lookup table of the one or more memory modules 204 to determine whether the task is designated as interacting with a load force. If the selected task is associated with the robot 100 interacting with a load force, the method 300 proceeds to step 320; otherwise, the method 300 proceeds to step 340.

As a non-limiting example of step 315, the one or more processors 202 determine that the selected task user interface element corresponding to the task of pulling is associated with the robot 100 interacting with a load force. In response to the selection (using the input device 266, for example), the user may subsequently define the parameterized actions of the pulling task, as described below in further detail.

Figure 4D:
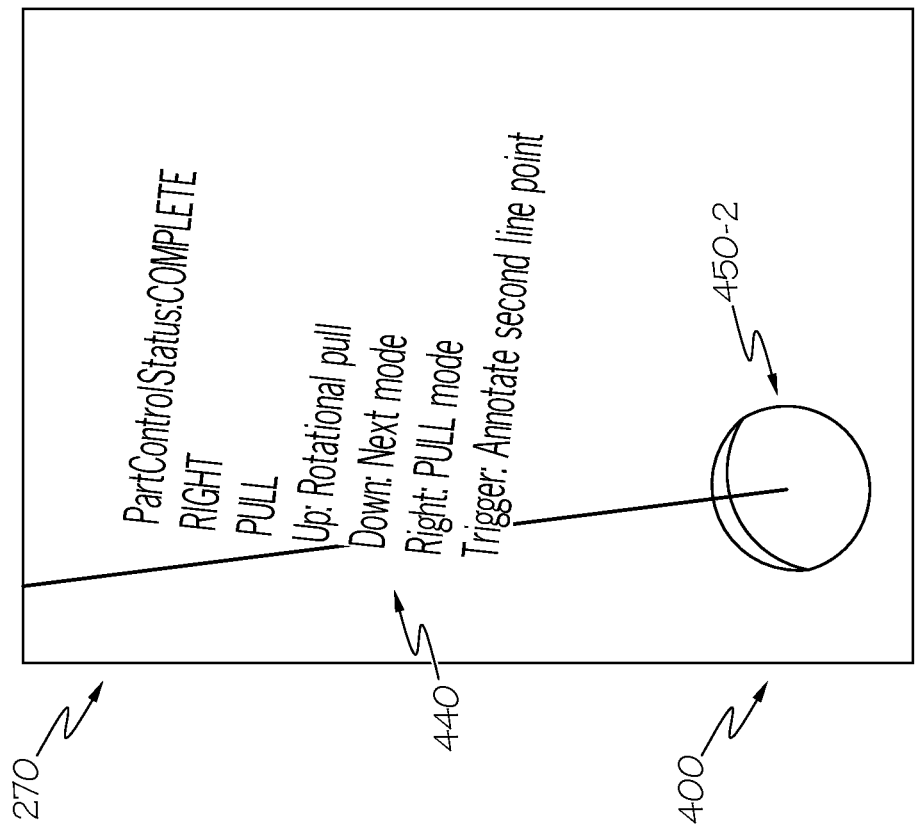
FIG. 4D depicts an example virtual reality representation of an environment displayed by the virtual reality system according to one or more embodiments described and illustrated herein
Figure 4C:
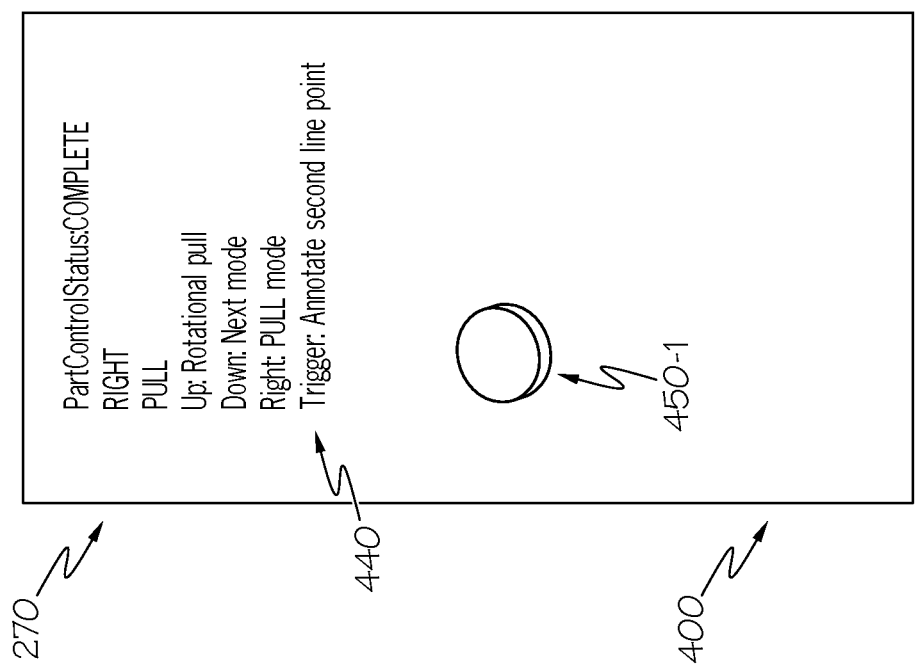
FIG. 4C depicts an example virtual reality representation of an environment displayed by the virtual reality system according to one or more embodiments described and illustrated herein

At step 320, the user defines one or more parameterized actions of the selected task, and the one or more processors 202 generate and transmit a force vector interface to the virtual reality system 160. In response to receiving the force vector interface, the display device 270 of the virtual reality system displays the force vector interface. As described above, at least one of the parameterized actions of the task may not be associated with interacting with load force. Accordingly, the display device 270 may display the force vector interface if the particular parameterized action being defined by the user is associated with interacting with the load force. As a non-limiting example of step 320 and as shown in FIGS. 4C-4D, the virtual reality representation 400 may display instructional text 440 indicating the instructions for defining the parameterized actions of the pulling task, such as defining a representative location of the pulling task using a first point 450-1 and a second point 450-2 (i.e., annotating a first line point and a second line point). Furthermore, since defining the representative location may not be associated with interacting with a load force, the virtual reality representation 400 may not generate the force vector interface.

As another non-limiting example, the parameterized action of opening the gripping assembly 108 to a desired angle of the pulling task may not be associated with interacting with the load force, even though the pulling task as a whole may be associated with interacting with the load force. As yet another non-limiting example, the parameterized action of moving the gripping assembly 108 to the 6D lift pose may be associated with interacting with the load force (e.g., the gripping assembly 108 needs to generate a force of 100N in order to move the gripping assembly 108 to the 6D lift pose).

In some embodiments, the display device 270 of the virtual reality system 160 may display additional graphical elements as the parameterized actions are defined. As a non-limiting example and as schematically depicted in FIG. 4E, in response to defining the representative location of the pulling task, the display device 270 may update the virtual reality representation 400 to include a graphical element 460 representing a gripping assembly 108 of the robot 100 and a graphical element 465 representing an arm 106 of the robot 100. Using the input device 266 of the virtual reality system 160, the user may manipulate the position of one of the graphical element 460 and the graphical element 465 such that it aligns with a line 455 located between the first point 450-1 and a second point 450-2.

Figure 4F:
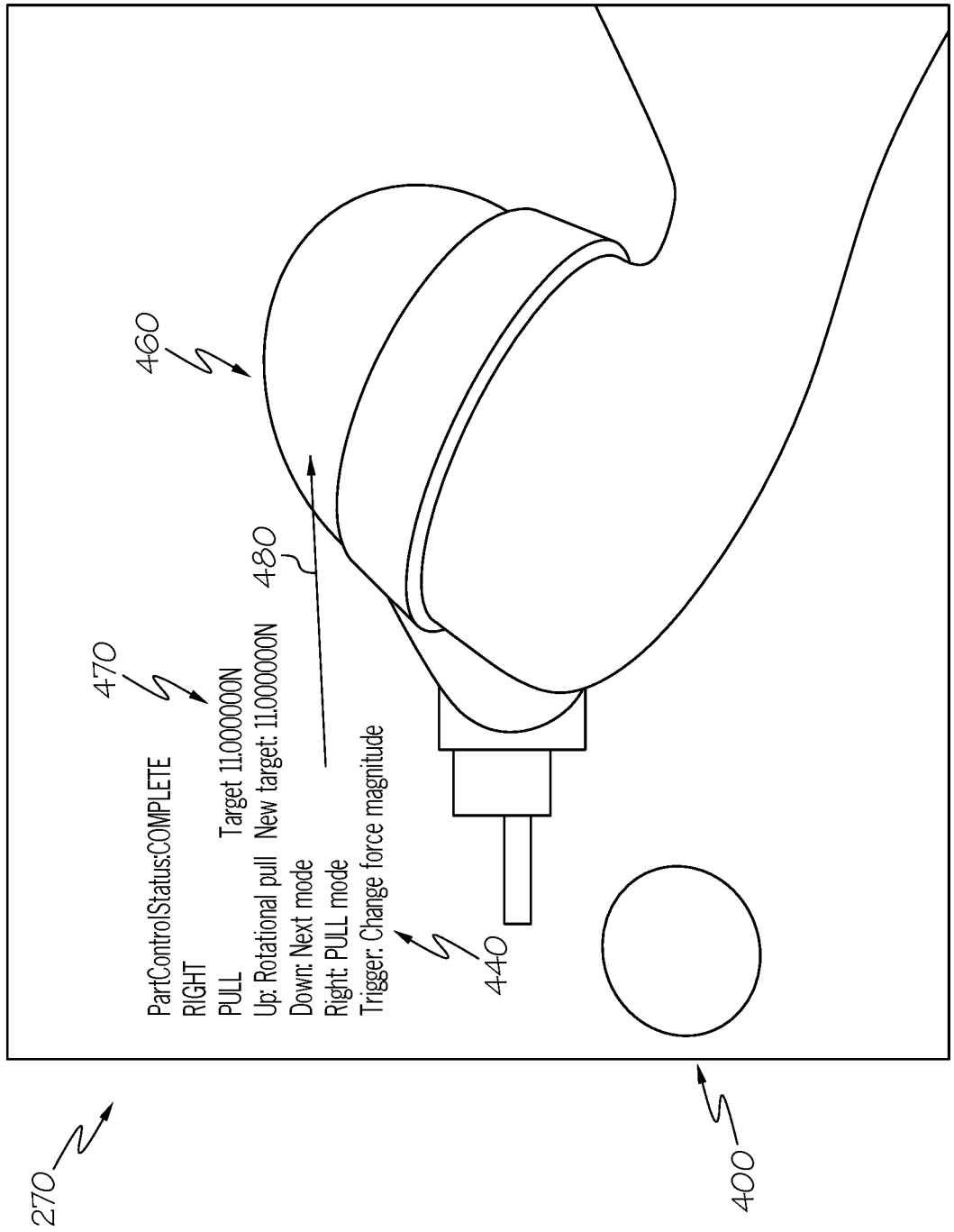
FIG. 4F depicts an example virtual reality representation of an environment displayed by the virtual reality system according to one or more embodiments described and illustrated herein.

Furthermore, if a parameterized action being defined by the user is associated with interacting with the load force, the display device 270 may update the virtual reality representation 400 to include the force vector interface. As a non-limiting example and as shown in FIG. 4F, the user may define the next parameterized action of the pulling task as defining rotation characteristics of the robot arm 106. Accordingly, the display device 270 may update the virtual reality representation 400 to include the force vector interface, which may include a prompt to enter a force magnitude value 470 and a interactively position a force arrow 480. The force magnitude value 470 may indicate a force value (e.g., 11N) associated with the parameterized action, and the force arrow 480 may indicate a direction associated with the parameterized action.

Referring back to FIG. 3, when the user is assigning at least one of the force magnitude and the force direction to the parameterized action at step 320, the motion training may be paused (e.g., using the input device 266) in order to assign the force magnitude and/or the force direction. Motion training may then be resumed once the force magnitude and/or the force direction are assigned to the parameterized action. As such, a task that is defined by the one or more parameterized motions include a force parameter that may be utilized by the robot 100 when autonomously operating the predefined task.

At step 325, the one or more processors 202 receive a force vector selection for the corresponding parameterized actions. As a non-limiting example of step 325, the user may define at least one of the force magnitude and the force direction using the input device 266 of the virtual reality system 160. In some embodiments, referring to FIG. 4F, the force magnitude value 470 and the force arrow 480 may be configured to update in response to the user defining the force magnitude and/or the force direction. As a non-limiting example, in response to increasing the force value of the parameterized action, the force magnitude value 470 may be updated and/or a length of the force arrow 480 may increase to reflect the updated force value. As another non-limiting example, in response to decreasing the force value of the parameterized action, the force magnitude value 470 may be updated and/or a length of the force arrow 480 may decrease to reflect the updated force value. As yet another non-limiting example, in response to adjusting the force direction, the force arrow 480 may adjust its shape, size, and/or orientation based on the adjusted force direction.

Referring back to FIG. 3, at step 330, the one or more processors 202 assign the selected force vector to the parameterized action and then proceeds to step 335.

At step 335, the one or more processors 202 determine whether the task includes additional parameterized actions. If so, the method 300 proceeds to step 320; otherwise, the method 300 proceeds to step 340. At step 340, the one or more processors 202 determine whether additional tasks of the robot 100 need to be defined. As a non-limiting example of step 340, a user may transmit, using the input device 266 of the virtual reality system 160, a signal to the robot 100 indicating whether additional tasks of the robot 100 need to be defined. If so, the method 300 proceeds to step 345. At step 345, the user of the virtual reality system 160 manipulates the robot 100 and selects the next task to be defined and then proceeds to step 315. If no additional tasks of the robot 100 need to be defined, the method 300 ends.

It should now be understood that embodiments of the present disclosure are directed to robots and virtual reality systems configured to assign force vectors to various tasks of a robot. Assigning force vectors to certain tasks ensures optimal robustness while the robot is executing various tasks. Furthermore, using the virtual reality system to assign force vectors of one or more tasks of the robot enables a user to define the one or more tasks and any associated force vectors without utilizing task space motion control to define the one or more tasks of the robot.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
an electronic controller configured to:
receive image data of an environment from an image capturing device;
identify an object located in the environment from the image data;
generate, for display, a region associated with the identified object and an indicator corresponding to the region indicating a task user interface element currently aligned with the region;
generate a virtual reality representation of the environment including a graphical element representing a component of a robot and the region associated with the identified object;
receive a manipulation, from a user via the virtual reality representation of the environment, of the graphical element representing the component of the robot;
generate a menu within the virtual reality representation of the environment comprising at least one task user interface element associated with a robotic task defined by various parameterized actions for the graphical element;
determine when an option for configuring a force parameter is selected from the at least one task user interface element in the menu;
prompt a user to configure the force parameter for a virtual robot manipulation task, wherein the prompt includes displaying a force arrow that the user interactively positions to indicate a force direction; and
assign at least one of a force magnitude or the force direction to the virtual robot manipulation task in response to an input received from the prompt to configure the force parameter.

2. The system of claim 1, wherein the electronic controller is configured to:
receive depth information corresponding to the environment from an imaging device; and
generate the virtual reality representation based on the image data and the depth information.

3. The system of claim 1, wherein determining when the option for configuring the force parameter is selected from the at least one task user interface element in the menu further causes the electronic controller to determine the at least one task user interface element is associated with at least one parameterized action.

4. The system of claim 1, wherein the electronic controller is configured to transmit at least one of the virtual reality representation and the menu to a display device.

5. The system of claim 1, wherein the electronic controller is configured to:
receive a selection of the at least one task user interface element from an input device; and
receive the input from the prompt to configure the force parameter from the input device.

6. A system comprising:
an electronic controller configured to:
receive image data of an environment from an image capturing device;
identify an object located in the environment from the image data;
generate, for display, a region associated with the identified object and an indicator corresponding to the region indicating a task user interface element currently aligned with the region;

display a virtual reality representation of the environment including a graphical element representing a component of a robot and the region associated with the identified object;

receive a manipulation, from a user via virtual reality representation of the environment, of the graphical element representing the component of the robot;

display a menu within the virtual reality representation comprising at least one task user interface element associated with a robotic task defined by various parameterized actions for the graphical element;

determine when an option for configuring a force parameter is selected from the at least one task user interface element in the menu;

display a prompt instructing a user to configure the force parameter for a virtual robot manipulation task, wherein the prompt includes displaying a force arrow that the user interactively positions to indicate a force direction; and transmit a signal indicating an assignment of at least one of a force magnitude or the force direction to the virtual robot manipulation task in response to an input received from the prompt to configure the force parameter.

7. The system of claim 6, wherein displaying the prompt further comprises displaying:
a force magnitude element configured to indicate a magnitude of force; and
a force direction element configured to indicate a direction of force.

8. The system of claim 7, wherein the input received from the prompt further comprises:
a first interaction with the force magnitude element using an input device; and
a second interaction with the force direction element using the input device.

9. The system of claim 6, wherein determining when the option for configuring the force parameter is selected from the at least one task user interface element in the menu further comprises receiving a selection of the at least one task user interface element using an input device.

10. The system of claim 6, wherein the electronic controller is configured to:
display the virtual reality representation based on the image data.

11. The system of claim 6, wherein determining when the option for configuring the force parameter is selected from the at least one task user interface element in the menu further causes the electronic controller to receive an indication that the at least one task user interface element is associated with at least one parameterized action.

12. A method comprising:
receiving image data of an environment from an image capturing device;
identifying an object located in the environment from the image data;
generating, for display, a region associated with the identified object and an indicator corresponding to the region indicating a task user interface element currently aligned with the region;
generating, by one or more processors, a virtual reality representation of the environment including a graphical element representing a component of a robot and the region associated with the identified object;

receiving a manipulation, from a user via the virtual reality representation of the environment, of the graphical element representing the component of the robot;

generating, by the one or more processors, a menu within the virtual reality representation of the environment comprising at least one task user interface element associated with a robotic task defined by various parameterized actions for the graphical element;

determining, by the one or more processors, when an option for configuring a force parameter is selected from the at least one task user interface element in the menu;

prompting, by the one or more processors, a user to configure the force parameter for a virtual robot manipulation task, wherein prompting includes displaying a force arrow that the user interactively positions to indicate a force direction; and assigning, by the one or more processors, at least one of a force magnitude or the force direction to the virtual robot manipulation task in response to an input received from the prompt to configure the force parameter.

13. The method of claim 12, further comprising:
receiving, by the one or more processors, depth information corresponding to the environment from an imaging device; and
generating, by the one or more processors, the virtual reality representation based on the image data and the depth information.

14. The method of claim 12, wherein determining when the option for configuring the force parameter is selected from the at least one task user interface element in the menu further comprises determining, by the one or more processors, the at least one task user interface element is associated with at least one parameterized action.

15. The method of claim 12, further comprising transmitting, by the one or more processors, at least one of the virtual reality representation and the menu to a display device.

16. The method of claim 12, further comprising:
receiving, by the one or more processors, a selection of the at least one task user interface element from an input device; and
receiving, by the one or more processors, the input from the prompt to configure the force parameter from the input device.

17. The method of claim 12, further comprising:
transmitting, by the one or more processors, the virtual reality representation to a virtual reality system, wherein the virtual reality representation is configured to cause the virtual reality system to display the virtual reality representation using a display device of the virtual reality system in response to receiving the virtual reality representation.

18. The method of claim 17, further comprising:
transmitting, by the one or more processors, the menu to the virtual reality system, wherein transmitting the menu is configured to cause the virtual reality system to display the menu using the display device in response to receiving the menu.

19. The method of claim 17, further comprising:
transmitting, by the one or more processors, the prompt to the virtual reality system, wherein transmitting the prompt is configured to cause the virtual reality system to display the prompt in response to receiving the prompt.

* * * * *